June 1, 1926.

H. L. BURKHARDT 1,586,944

PLANETARY GEAR MECHANISM

Filed May 23, 1922    3 Sheets-Sheet 1

INVENTOR
HARRY L. BURKHARDT.
BY Drury, Strong, Townsend
and Loftus
ATT'YS.

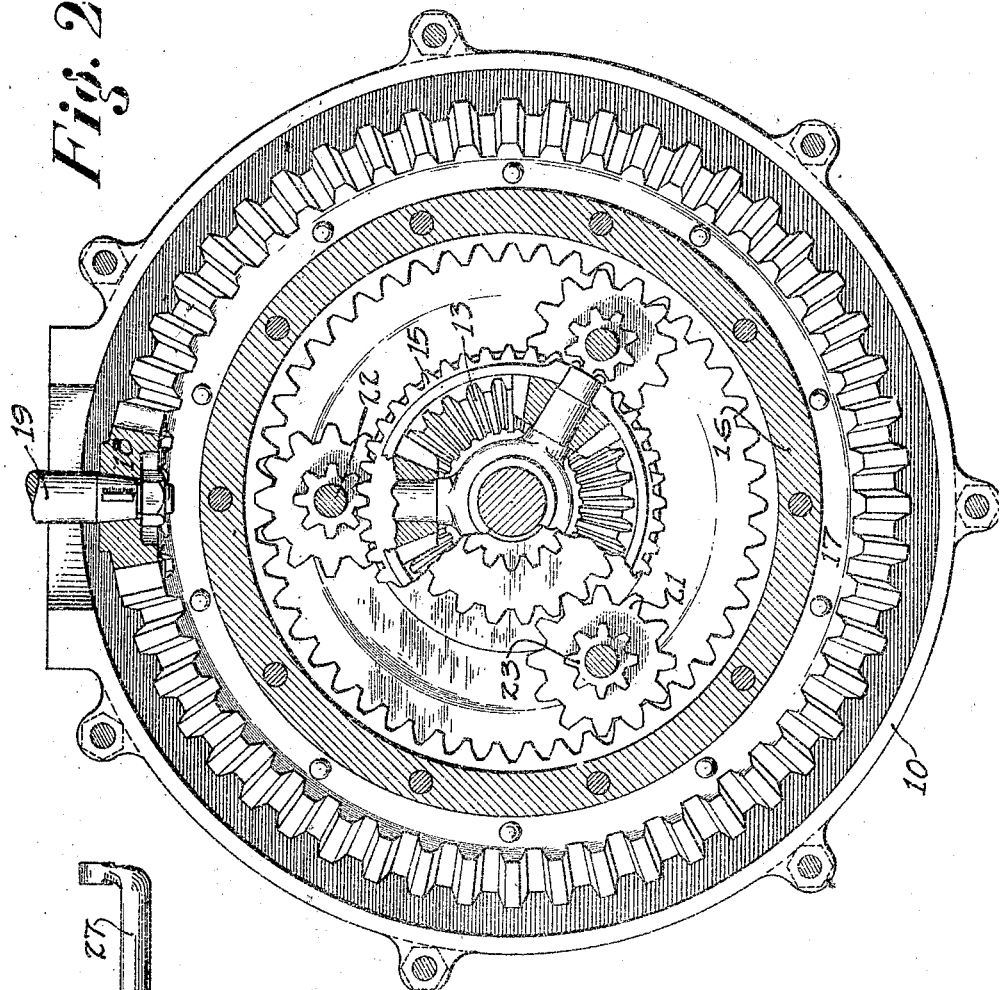
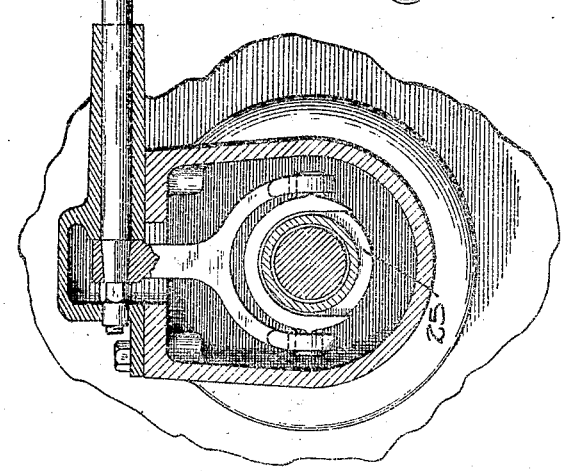

INVENTOR.
HARRY L. BURKHARDT.

UNITED STATES PATENT OFFICE.

HARRY L. BURKHARDT, OF BERKELEY, CALIFORNIA, ASSIGNOR TO RUCKSTELL SALES & MANUFACTURING COMPANY, OF BERKELEY, CALIFORNIA, A CORPORATION OF CALIFORNIA.

PLANETARY-GEAR MECHANISM.

Application filed May 23, 1922. Serial No. 563,064.

This invention relates to planetary gear mechanism.

Where planetary gear mechanism is interposed between the ring gear and differential casing of a rear axle, as shown, for instance, in United States Letters Patent No. 1,165,915, issued December 28th, 1915, to Thomas H. Sparks, or in the pending application of Glover E. Ruckstell, Serial No. 545,936, filed Mar. 23, 1922, the spider or ring which carries the planetary pinions is connected directly to the differential casing and therefore it is difficult to get as great a speed reduction as is desired in many situations. Also in the planetary mechanism as heretofore constructed considerable wear occurs on the planetary pinions and the bearings therefor owing to the use of rings or spiders.

The present invention has for its object to do away with pins, rings or cages usually employed for supporting the planetary pinions and also to obtain a greater reduction in speed between the ring gear and differential casing than has been possible to obtain heretofore. This I accomplish by so arranging the mechanism that the planetary pinions will be supported entirely by the internal toothed gear and the sun gear, and will be held in proper alignment by a second set of pinions spaced axially therefrom and moving in a similar orbit. Opposite pinions are connected by means of a spindle or shaft, which spindle or shaft carries a pinion which meshes with a gear on the driven member. By means of the gear connections between the planetary spindles and the driven member a greater reduction in speed can be obtained when the planetary pinions are functioning in low speed position.

In the accompanying drawings,

Fig. 2 shows a cross section of the device shown in Fig. 1.

Fig. 3 shows a sectional view through a portion of the axle illustrating the control means.

Figure 1:
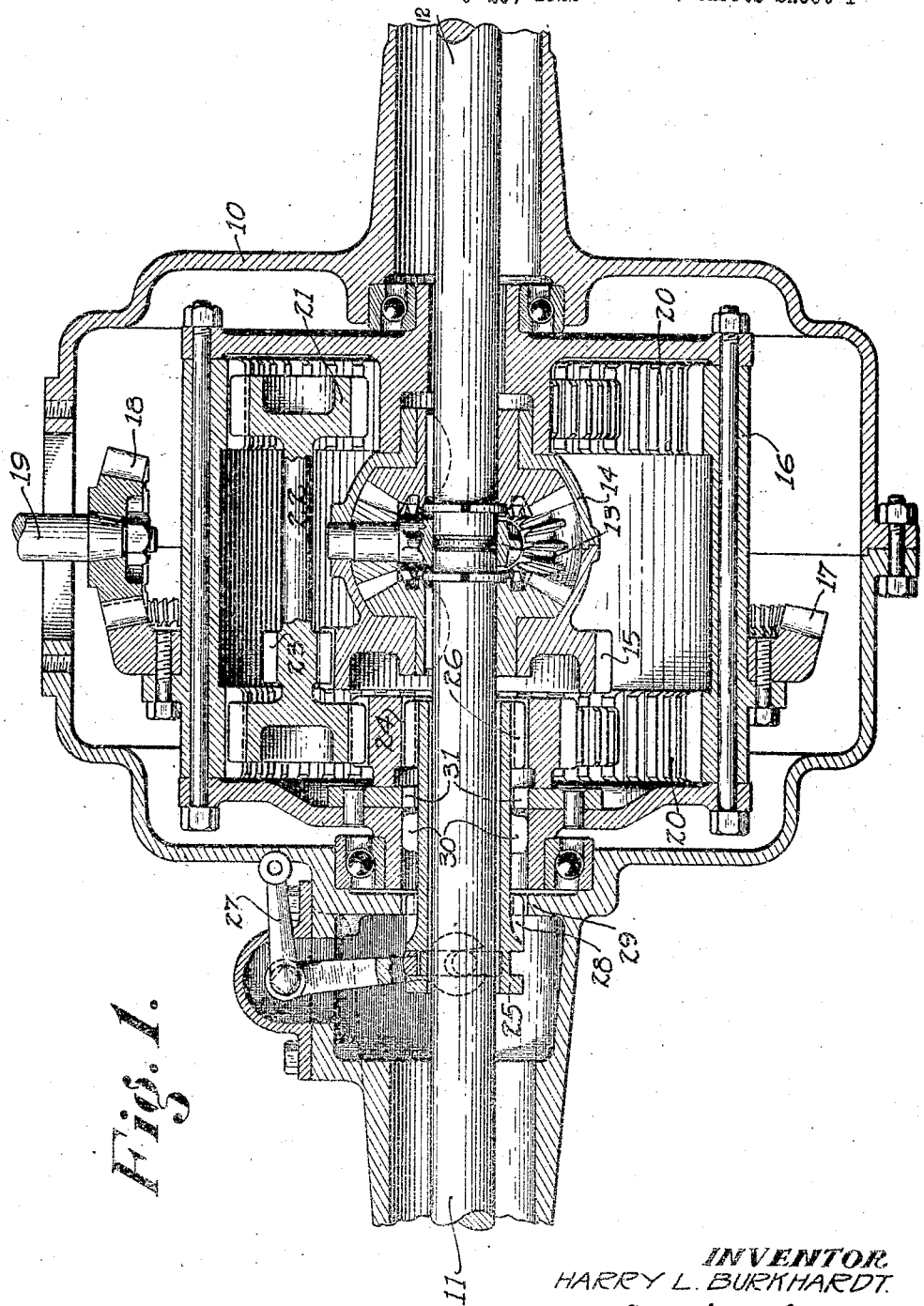
Fig. 1 shows a longitudinal sectional view of the mechanism applied to the rear axle of an automobile.

Describing in detail the form shown in Figs. 1 and 2, an axle housing is indicated at 10, within which are axle shafts 11 and 12 which are connected together by the usual differential mechanism 13. The differential casing is indicated at 14 and is fitted at one side with a driven gear 15.

A housing 16 includes the planetary mechanism presently to be described, and fixed upon the housing 16 is a ring gear 17 which is driven by a bevel pinion 18 on a shaft 19. This housing carries within it at each side of the differential casing an internal gear 20. Meshing with each internal gear at equally spaced points is a plurality of planetary pinions 21, opposite pinions being connected across by a shaft or axle 22. Fixed upon each shaft or axle intermediate the ends thereof is a pinion 23 meshing with the gear 15 on the differential casing.

The planetary pinions at one side mesh with a sun gear 24. Since there is no sun gear meshing with the other set of pinions, the latter in reality constitute balancing or aligning pinions.

The sun gear 24 is in the form of a ring gear and is supported upon a clutch sleeve 25 slidably mounted on one of the axle shafts and having teeth 26 to engage with clutch teeth on the inner circumference of the sun gear 24. This clutch sleeve is controlled by a shifting fork 27. It is provided with teeth 28 to lock with a plate 29 on the axle housing when in the position shown in Fig. 1, whereby to hold the sun gear against turning. Thereby the planetary pinions will revolve around the sun gear and transmit a reduced speed to the differential casing. When the sleeve is shifted to the left, the teeth 26 on the clutch sleeve will without entirely disengaging the internal teeth on the sun-gear 24 lock with a plate 31 on the planetary housing and thus cause the planetary mechanism to rotate as a unit and drive the differential housing at a direct or high speed, it being understood that the teeth 28 have meantime been released from the teeth 29. In between the locking positions the sleeve is free to rotate and thereby to permit the planetary mechanism to assume a neutral or inoperative position. Members 30 are provided upon the sleeve 25 to support the same in the hub of the housing 16. These members are preferably in the form of ribs or teeth, to facilitate insertion of the sleeve through the toothed opening in the end plate 29 of the axle housing.

Figure 4:
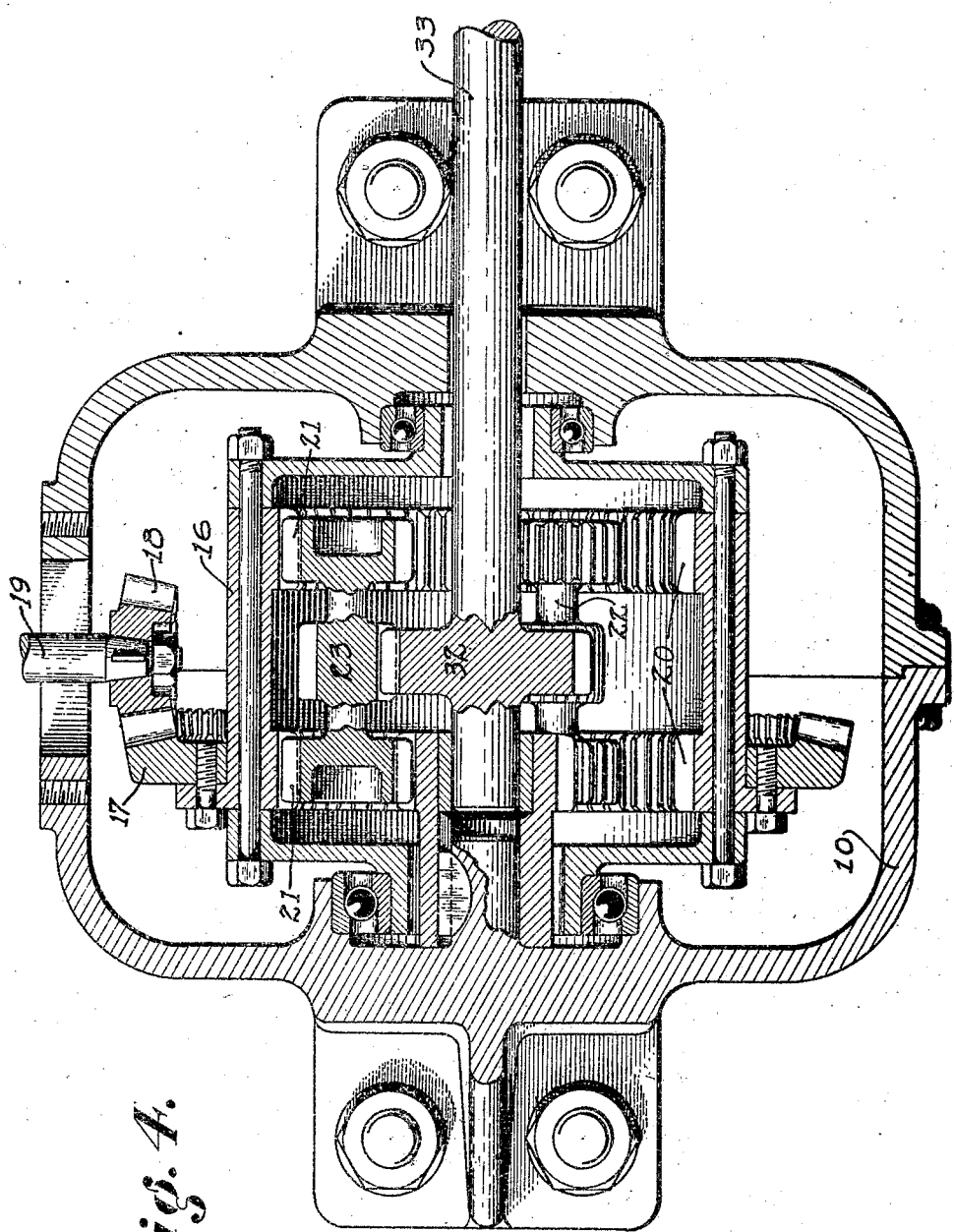
Fig. 4 shows a longitudinal sectional view of the mechanism for general purposes.

In Fig. 4 I show the planetary mechanism separate from the rear axle or differential. A driven gear 32, fixed upon a driven shaft 33, is substituted for the differential and axle shafts. The clutch sleeve for controlling the motion of the sun gear is also omitted in this form, so that the device functions merely as a reduction gearing between the ring gear 17 and driven gear 32.

An important feature of this invention is a planetary gear set in which it is unnecessary to carry the planet pinions on cages or rings of their own. In prior planetary gear sets there has been required a cage or carrier of some nature upon which the planet pinions rotate and to which they transmit their motion. The planet pinions in the present instance require no bearings, since they are supported between the outer internal gear and the center or sun gear, both of which rotate upon a common axis. The two internal gears must be fixed with relation to each other, so that their teeth will be in a direct line in order that the axes of the planetary pinions may be held parallel with the common axis of the gear set.

This construction also makes it possible to obtain greater speed reduction than in cases where the planetary pinions are carried on a ring or spider and the latter connected directly to the driven member, as in prior devices. The pinions on the spindles of the planetary pinions, which mesh with the driven gear, will, when the device is in low speed position, bring about a reduction in speed between the planetary pinions and the driven member. This reduction may be obtained in any desired amount by proportioning the sizes of the pinions 23 and driven gear 32.

Various changes in the construction and arrangement of the several parts herein shown and described may be employed without departing from the spirit of the invention as disclosed in the appended claims.

Having thus described my invention, what I claim and desire to secure by Letters Patent is:

1. In combination with a driving and a driven member, a planetary mechanism interposed between, a gear carried by the driving member, a set of planetary pinions meshing with said gear, a sun gear with which said planetary pinions also mesh, a second set of planetary pinions axially aligned with the planetary pinions and moving through a corresponding orbit, axles connecting the aligned pinions and means on the axles to actuate said driven member.

2. In combination with a driving and driven member, a planetary mechanism interposed between and comprising a pair of internal gears spaced laterally apart, a plurality of planetary pinions meshing with each internal gear, axles connecting opposite planetary pinions together, a gear on each axle for actuating the driven member and a sun gear meshing with one set of planetary pinions.

3. In combination with a driving and driven member, a planetary mechanism interposed between and comprising a pair of internal gears spaced laterally apart, a plurality of planetary pinions meshing with each internal gear, axles connecting opposite planetary pinions together, a gear on each axle for actuating the driven member, a sun gear meshing with one set of planetary pinions, and means for controlling the operation of the sun gear whereby to vary the speed of the planetary pinions.

4. In combination with a rear axle and a differential mechanism, a gear on the casing of the differential mechanism, a ring gear for driving the differential housing and planetary mechanism interposed between the ring gear and the gear on the differential casing, said planetary mechanism comprising an internal gear driven by the ring gear, a set of planetary pinions meshing with the internal gear, an axle for each of the planetary pinions, means for maintaining said axles in parallel relation, a pinion on each axle meshing with the gear on the differential mechanism, and a sun gear meshing with said planetary pinions and means for controlling the operation of the sun gear to vary the action of the planetary pinions.

5. In combination with a driving and a driven member, a gear on the driving member, planetary pinions meshing with said gear, means to control the operation of said pinions, spindles on said planetary pinions, a set of pinions on opposite ends of said spindles, movable conjointly with said planetary pinions, means engaging said last-named pinions for guiding and supporting said spindles and gear connections between the spindles and the driven member for driving the latter.

6. The combination with a driving and a driven member, of a planetary mechanism, including a driving gear, planetary pinions in mesh therewith, means for controlling the operation of said planetary pinions, spindles on said planetary pinions, pinions carried by said spindles and ring gear for supporting and guiding said last-named pinions and thereby the planetary pinions and gear connections between the spindles and driven member for driving the latter.

HARRY L. BURKHARDT.